(12) United States Patent
Stefanisin et al.

(10) Patent No.: US 8,158,731 B2
(45) Date of Patent: Apr. 17, 2012

(54) BIOPOLYMER COMPOSITIONS HAVING IMPROVED FLEXIBILITY

(75) Inventors: Kimberly L. Stefanisin, Oak Lawn, IL (US); Urvil B. Shah, Mokena, IL (US); Stephen O'Rourke, Bolingbrook, IL (US); Gary Wentworth, Morris, IL (US)

(73) Assignee: Hallstar Innovations Corp., Chicago, IL (US)

( * ) Notice: Subject to any disclaimer, the term of this patent is extended or adjusted under 35 U.S.C. 154(b) by 0 days.

(21) Appl. No.: 12/694,426

(22) Filed: Jan. 27, 2010

(65) Prior Publication Data

US 2011/0184094 A1 Jul. 28, 2011

(51) Int. Cl.
 *C08G 63/02* (2006.01)
(52) U.S. Cl. ......... 525/437; 525/418; 525/450; 528/272
(58) Field of Classification Search .................. 525/418, 525/437, 450; 528/272
 See application file for complete search history.

(56) References Cited

U.S. PATENT DOCUMENTS

| | | | | |
|---|---|---|---|---|
| 4,166,056 | A * | 8/1979 | Satterly et al. | 524/308 |
| 5,180,765 | A | 1/1993 | Sinclair | |
| 5,216,050 | A | 6/1993 | Sinclair | |
| 5,252,642 | A | 10/1993 | Sinclair et al. | |
| 5,444,113 | A | 8/1995 | Sinclair et al. | |
| 5,502,158 | A | 3/1996 | Sinclair et al. | |
| 5,760,118 | A | 6/1998 | Sinclair et al. | |
| 6,803,443 | B1 * | 10/2004 | Ariga et al. | 528/354 |
| 7,368,511 | B2 | 5/2008 | Hale et al. | |
| 7,550,541 | B2 | 6/2009 | Ohme et al. | |
| 2006/0025544 | A1 * | 2/2006 | Koube et al. | 525/437 |
| 2007/0260019 | A1 * | 11/2007 | Ohme et al. | 525/400 |

FOREIGN PATENT DOCUMENTS

| | | |
|---|---|---|
| EP | 0980894 A1 | 2/2000 |
| EP | 1460107 A1 | 9/2004 |
| EP | 1460107 A1 * | 9/2004 |
| EP | 2042548 A1 | 4/2009 |
| WO | WO-2006/026111 A1 | 3/2006 |

OTHER PUBLICATIONS

American Oil Chemists' Society, 1993, "Sampling and Analysis of Commercial Fats and Oils," Official Method Cd 3d-63, Acid Value.
ASTM Standard D 4274-05, "Standard Test Methods for Testing Polyurethane Raw Materials: Determination of Hydroxyl Numbers of Polyols," ASTM International, West Conshohocken, PA, 2005, DOI: 10.1520/D4274-05.
Ecoflex F BX 7011 Product Information Jun. 2010.
Ecoflex Product Brochure, available from http://www2.basf.us/businesses/plasticportal/ksc_ecoflex_biodegradable_plastic_literature.htm.
Witt et al., "Biodegradation of aliphatic-aromatic copolyesters: evaluation of the final biodegradability and ecotoxicological impact of degradation intermediates," *Chemosphere* 44:289-299 (2001).
International Search Report and Written Opinion in PCT/US2011/022191 dated May 16, 2011.

* cited by examiner

*Primary Examiner* — Alicia Toscano
(74) *Attorney, Agent, or Firm* — Marshall, Gerstein & Borun LLP

(57) ABSTRACT

The present disclosure is directed to polymer blends comprising a biopolymer and a substituted or unsubstituted aliphatic polyester. The aliphatic polyester comprises repeating units derivable from a substituted or unsubstituted aliphatic diacid, repeating units derivable from a substituted or unsubstituted aliphatic diol, and one or two terminator units derivable from a substituted or unsubstituted aliphatic alcohol. The polymer blends disclosed herein provide improved flexibility, and are useful, for example, in the production of packaging materials, industrial products, durable goods, and the like.

24 Claims, No Drawings

BIOPOLYMER COMPOSITIONS HAVING IMPROVED FLEXIBILITY

BACKGROUND

1. Field of the Disclosure

The disclosure relates generally to renewably-sourced and biodegradable polymer blends, and to methods of improving the flexibility of biopolymers. More specifically, the disclosure relates to polymer blends comprising a biopolymer and an aliphatic polyester, and to methods of improving the flexibility of biopolymers by combining a biopolymer and an aliphatic polyester as disclosed herein.

2. Brief Description of Related Technology

Conventional petroleum-based polymers include traditional plastics used in packaging and other consumer product applications. Petroleum-based polymer products, however, have several disadvantages including the accumulation of non-degradable plastics in landfills and the use of non-renewably sourced materials. Biopolymers provide an alternative to petroleum-based polymers. In contrast to petroleum-based polymers, products prepared from biopolymers are biodegradable and/or use materials obtained from renewable natural sources.

While overcoming many of the disadvantages of traditional petroleum-based polymers, biopolymers can suffer from other disadvantages. Many biopolymers are difficult to process and/or demonstrate other undesirable physical properties, such as poor flexibility. The physical properties of biopolymers can be modified by blending with other materials to obtain biodegradable and/or renewably-sourced polymer materials having more desirable physical properties. The polymer blends disclosed herein provide biopolymers having improved flexibility, and are useful, for example, in the production of packaging materials, industrial products, durable goods, and the like.

SUMMARY

One aspect of the disclosure is directed to a polymer blend comprising a biopolymer (e.g., polylactic acid) and an aliphatic polyester comprising repeating units derivable from a substituted or unsubstituted aliphatic diacid, repeating units derivable from a substituted or unsubstituted aliphatic diol, and one or two terminator units derivable from a substituted or unsubstituted aliphatic alcohol. Another aspect of the disclosure is directed to a method for increasing the flexibility of a biopolymer (e.g., polylactic acid) comprising mixing a biopolymer and a polyester, wherein the polyester comprises repeating units derivable from a substituted or unsubstituted aliphatic diacid, repeating units derivable from a substituted or unsubstituted aliphatic diol, and one or two terminator units derivable from a substituted or unsubstituted aliphatic alcohol. Various biopolymers can be used in the disclosed compositions and methods, including, but not limited to polylactic acid, polyhydroxybutyrate, polyvinyl alcohol, polybutylene succinate, polyhydroxyalkanoates, polycaprolactones, aliphatic-aromatic copolyesters, starches, celluloses, and mixtures thereof.

In some embodiments, the aliphatic polyester comprises repeating units derivable from a substituted or unsubstituted $C_2$ to $C_{20}$ aliphatic diacid, for example, a substituted or unsubstituted $C_2$ to $C_{10}$ aliphatic diacid. In some embodiments, the aliphatic polyester comprises repeating units derivable from a substituted or unsubstituted $C_2$ to $C_{20}$ aliphatic diol, for example, a substituted or unsubstituted $C_2$ to $C_{10}$ aliphatic diol. In some embodiments, the aliphatic polyester comprises one or two terminator units derivable from a substituted or unsubstituted $C_1$ to $C_{20}$ aliphatic alcohol. In some embodiments, the aliphatic polyester comprises repeating units derivable from a substituted or unsubstituted $C_2$ to $C_{20}$ aliphatic diacid, for example, a substituted or unsubstituted $C_2$ to $C_{10}$ aliphatic diacid; repeating units derivable from a substituted or unsubstituted $C_2$ to $C_{20}$ aliphatic diol, for example, a substituted or unsubstituted $C_2$ to $C_{10}$ aliphatic diol; and one or two terminator units derivable from a substituted or unsubstituted $C_1$ to $C_{20}$ aliphatic alcohol.

In some embodiments, the polyester of the polymer blend comprises repeating units derivable from a diacid selected from the group consisting of succinic acid, glutaric acid, adipic acid, and sebacic acid. In some embodiments, the polyester of the polymer blend comprises repeating units derivable from a diol selected from the group consisting of 1,3-propanediol and 1,2-propanediol. In some embodiments, the polyester of the polymer blend comprises one or two terminating units derivable from an alcohol selected from the group consisting of 1-octanol, 1-decanol, and mixtures thereof. In some embodiments, the polyester of the polymer blend comprises repeating units derivable from a diacid selected from the group consisting of succinic acid, glutaric acid, adipic acid, and sebacic acid; repeating units derivable from a diol selected from the group consisting of 1,3-propanediol and 1,2-propanediol, and one or two terminating units derivable from an alcohol selected from the group consisting of 1-octanol, 1-decanol, and mixtures thereof.

In some embodiments, the polyester of the polymer blend has a formula I:

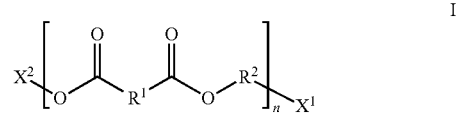

I wherein n is 1 to 1000; $R^1$ is selected from the group consisting of a bond and a substituted or unsubstituted aliphatic hydrocarbon group having 1 to 18 carbon atoms; $R^2$ is a substituted or unsubstituted aliphatic hydrocarbon group having 1 to 20 carbon atoms; $X^1$ is selected from the group consisting of —OH, —O$_2$C—$R^1$—CO$_2$H, and —O$_2$C—$R^1$—CO$_2R^3$; $X^2$ is selected from the group consisting of —H, —$R^2$—OH, and $R^3$; and $R^3$ is a substituted or unsubstituted aliphatic hydrocarbon group having 1 to 20 carbon atoms. In some embodiments, the polyester of formula I is defined as above with the proviso that if $X^1$ is —OH or —O$_2$C—$R^1$—CO$_2$H, then $X^2$ is $R^3$.

In some embodiments, n is 2 to 40, for example, 2 to 20. In some embodiments, $R^1$ is $C_1$ to $C_8$ alkyl, for example, $C_2$ to $C_4$ alkyl. In some embodiments, $R^2$ is $C_1$ to $C_{10}$ alkyl, for example, $C_3$ alkyl. In some embodiments, $R^3$ is $C_1$ to $C_{20}$ alkyl, for example, $C_8$ to $C_{10}$ alkyl. In some embodiments, $R^1$ is selected from the group consisting of —(CH$_2$)$_2$—, —(CH$_2$)$_3$—, —(CH$_2$)$_4$—, and —(CH$_2$)$_8$—. In some embodiments $R^2$ is selected from the group consisting of —(CH$_2$)$_3$—, —CH$_2$CH(CH$_3$)—, and —CH(CH$_3$)CH$_2$—. In some embodiments, $R^3$ is a mixture comprising —(CH$_2$)$_7$CH$_3$ and —(CH$_2$)$_9$CH$_3$.

In some embodiments, the polyester of the polymer blend is present in an amount of about 5 to about 30 parts by weight per hundred parts by weight of the biopolymer.

Another aspect of the disclosure is directed to a polymer blend comprising a biopolymer and an aliphatic polyester comprising repeating units derivable from a diacid selected from the group consisting of succinic acid, glutaric acid, adipic acid, and sebacic acid; repeating units derivable from a diol selected from the group consisting of 1,3-propanediol and 1,2-propanediol; and one or two terminator units derivable from an alcohol selected from the group consisting of 1-octanol, 1-decanol, and mixtures thereof. In some embodiments, the polyester of the polymer blend is present in an amount of about 5 to about 30 parts by weight per hundred parts by weight of the biopolymer. In some embodiments, the polyester has an acid value of about 8 to about 20. In some embodiments, the polyester has a hydroxyl value of about 40 to about 110.

DETAILED DESCRIPTION

The claimed invention is susceptible of embodiments in many different forms. Preferred embodiments, as disclosed herein, are to be considered exemplary of the principles of the claimed invention and thus not intended to limit the broad aspects of the claimed invention to the embodiments illustrated.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

As used herein, the term "aliphatic" refers to non-aromatic compounds or functional groups. Aliphatic compounds or functional groups can be linear or branched, cyclic or acyclic, and saturated or unsaturated. Unsaturated aliphatic compounds or functional groups can have 1, 2, 3, or more double or triple bonds. Aliphatic compounds or functional groups optionally can be substituted, for example, with one or more hydroxy (—OH), amino (—NH$_2$), oxo (═O), halo (—F, —Cl, —Br, or —I), and thio (—SH) groups or a combination thereof. Aliphatic compounds or functional groups also can be interrupted by one or more heteroatoms such as O, S, or N.

As used herein, the term "aliphatic hydrocarbon group" refers to a non-aromatic hydrocarbon group, nonlimiting examples of which include alkyl groups, alkenyl groups, and alkynyl groups. Aliphatic hydrocarbon groups can be linear or branched, cyclic or acyclic, and saturated or unsaturated. Unsaturated aliphatic hydrocarbon groups can have 1, 2, 3, or more double or triple bonds. Aliphatic hydrocarbon groups optionally can be substituted, for example, with one or more hydroxy (—OH), amino (—NH$_2$), oxo (═O), halo (—F, —Cl, —Br, or —I), and thio (—SH) groups or a combination thereof. Aliphatic hydrocarbon groups also can be interrupted by one or more heteroatoms such as O, S, or N.

As used herein, the term "alkyl" refers to straight chained and branched saturated hydrocarbon groups, nonlimiting examples of which include methyl, ethyl, and straight chain and branched propyl and butyl groups. Alkyl groups optionally can be substituted, for example, with one or more hydroxy (—OH), amino (—NH$_2$), oxo (═O), halo (—F, —Cl, —Br, or —I), and thio (—SH) groups or a combination thereof. Alkyl groups also can be interrupted by one or more heteroatoms such as O, S, or N.

As used herein, the term "alkenyl" refers to straight chained and branched hydrocarbon groups containing at least one carbon-carbon double bond, nonlimiting examples of which include straight chain and branched ethenyl and propenyl groups. Alkenyl groups optionally can be substituted, for example, with one or more hydroxy (—OH), amino (—NH$_2$), oxo (═O), halo (—F, —Cl, —Br, or —I), and thio (—SH) groups or a combination thereof. Alkenyl groups also can be interrupted by one or more heteroatoms such as O, S, or N.

As used herein, the term "alkynyl" refers to straight chained and branched hydrocarbon groups containing at least one carbon-carbon triple bond, nonlimiting examples of which include straight chain and branched ethynyl and propynyl groups. Alkynyl groups optionally can be substituted, for example, with one or more hydroxy (—OH), amino (—NH$_2$), oxo (═O), halo (—F, —Cl, —Br, or —I), and thio (—SH) groups or a combination thereof. Alkynyl groups also can be interrupted by one or more heteroatoms such as O, S, or N.

As used herein, the term "biopolymer" refers to a polymer generated from renewable natural sources and/or a biodegradable polymer. Biopolymers generated from renewable natural sources can be made from at least 5% renewably-sourced materials, for example at least 10%, at least 20%, at least 30%, at least 40%, at least 50%, at least 60%, at least 70%, at least 80%, at least 90%, and/or 100% renewably-sourced materials. Biopolymers also include biodegradable polymers such as biodegradable petroleum-based polymers and biodegradable polymer blends (e.g., polymer blends of petroleum-based and plant-based polymers). Biopolymers can be produced by biological systems such as microorganisms, plants, or animals, or obtained by chemical synthesis.

The present disclosure is directed to a polymer blend comprising a biopolymer and an aliphatic polyester. The aliphatic polyesters disclosed herein have at least two ester bonds, for example, three ester bonds, four ester bonds, or more. The aliphatic polyester comprises repeating units derivable from a substituted or unsubstituted aliphatic diacid, repeating units derivable from a substituted or unsubstituted aliphatic diol, and one or two terminator units derivable from a substituted or unsubstituted aliphatic alcohol. As used herein, a "repeating unit derivable from" a diacid or diol refers to that portion of the diacid or diol which remains after reaction of the diacid or diol to form one or more ester bonds. The polyesters disclosed herein include at least one, for example, two, three, or more repeating units derivable from one or more aliphatic diacids. Similarly, the polyesters disclosed herein include at least one, for example, two, three, or more repeating units derivable from one or more aliphatic diols. As used herein, a "terminator unit derivable from" an alcohol refers to that portion of the alcohol which remains after reaction of the alcohol to form an ester bond. The polyesters disclosed herein include, for example, one or two terminator units derivable from one or more aliphatic alcohols.

In some embodiments, the polyesters of the polymer blends disclosed herein comprise repeating units derivable from one or more substituted or unsubstituted aliphatic diacids (which also are known as dicarboxylic acids) including, but not limited to, saturated aliphatic diacids such as oxalic acid (ethanedioic acid), malonic acid (propanedioic acid), succinic acid (butanedioic acid), glutaric acid (pentanedioic acid), adipic acid (hexanedioic acid), pimelic acid (heptandioic acid), suberic acid (octanedioic acid), azelaic acid (nonanedioic acid), sebacic acid (decandioic acid), dodecandioic acid, cyclopentanedicarboxylic acid, cyclohexanedicarboxylic acid, cycloheptanedicarboxylic acid, and cyclooctanedicarboxylic acid; and unsaturated aliphatic diacids such as fumaric acid ((E)-butendioic acid), maleic acid ((Z)-butenedioic acid), cis-glutaconic acid ((Z)-2-pentenedioic acid), trans-glutaconic acid ((E)-2-pentenedioic acid), itaconic acid (2-methylidenebutanedioic acid), cis-γ-hydromuconic acid ((Z)-2-hexenedioic acid), and trans-γ-hydromuconic acid ((E)-2-hexenedioic acid). Other substituted or unsubstituted aliphatic diacids include, but are not limited to, aliphatic diacids having 2 to 20 carbon atoms, for example, 10 carbon atoms, 9 carbon atoms, 8 carbon atoms, 7 carbon atoms, 6 carbon atoms, 5 carbon atoms, 4 carbon atoms, and/or 3 carbon atoms. Two or more diacids can be used in combination.

In some embodiments, the polyesters of the polymer blends disclosed herein comprise repeating units derivable from one or more substituted or unsubstituted aliphatic diols including, but not limited to, saturated aliphatic diols such as ethylene glycol (ethane-1,2-diol), propylene glycol (1,2-propanediol), 1,3-propanediol, 1,2-butanediol, 1,3-butanediol, 1,4-butanediol, 2,3-butanediol, 1,2-pentanediol, 1,3-pentanediol, 1,4-pentanediol, 1,5-pentanediol, 2,3-pentanediol, and 2,4-pentanediol; and unsaturated aliphatic diols such as 3-butene-1,2-diol and 2-butene-1,4-diol. Other substituted or unsubstituted aliphatic diols include, but are not limited to, diols having 2 to 20 carbon atoms, for example, 10 carbon atoms, 9 carbon atoms, 8 carbon atoms, 7 carbon atoms, 6 carbon atoms, 5 carbon atoms, 4 carbon atoms, and/or 3 carbon atoms. Two or more diols can be used in combination.

In some embodiments, the polyesters of the polymer blends disclosed herein comprise one or more terminating units derivable from one or more substituted or unsubstituted aliphatic alcohols including, but not limited to, saturated aliphatic alcohols such as methanol, ethanol, propanol (e.g., n-propanol and isopropanol), butanol (e.g., 1-butanol, 2-butanol, iso-butanol, and tert-butanol), pentanol, hexanol, heptanol, octanol (e.g., 1-octanol and 2-ethylhexanol), nonanol (e.g, pelargonic alcohol), decanol (e.g., 1-decanol, also known as capric alcohol), undecanol, dodecanol (lauryl alcohol), tridecanol, tetradecanol (myristyl alcohol), pentadecanol, hexadecanol, heptadecanol, octadecanol, and eicosanol; and unsaturated aliphatic alcohols such as cis-9-dodecenol ($C_{12-1}$), cis-9-tetradecenol ($C_{14-1}$), cis-9-hexadecenol ($C_{16-1}$), cis-9-octadecenol ($C_{18-1}$), cis-cis-9,12-octadecadienol ($C_{18-2}$), cis-cis-cis-9,12,15-octadecatrienol ($C_{18-3}$), cis-trans-trans-9,11,13-octadecatrienol ($C_{18-3}$), octadecatetraenol ($C_{18-4}$), cis-11-eicosenol ($C_{20-1}$), eicosadienol ($C_{20-2}$), eicosatrienol ($C_{20-3}$), 5,8,11,14-eicosatetraenol ($C_{20-4}$), eicosapentaenol ($C_{20-5}$), cis-13-docosenol ($C_{22-1}$), docosatetraenol ($C_{22-4}$), 4,8,12,15,19-docosapentaenol ($C_{22-5}$), docosahexaenol ($C_{22-6}$), tetracosenol ($C_{24-1}$), and 4,8,12,15,18,21-tetracosahexaenol ($C_{24-6}$), where the number in parentheses indicates the number of carbon atoms, and the number of double bonds, e.g., ($C_{24-6}$) indicates a hydrocarbon chain having 24 carbon atoms and 6 double bonds. Other substituted or unsubstituted aliphatic alcohols include, but are not limited to, alcohols having 1 to 20 carbon atoms, for example, 2 to 18 carbon atoms, 4 to 16 carbon atoms, 5 to 14 carbon atoms, 6 to 12 carbon atoms, and/or 8 to 10 carbon atoms. Two or more alcohols can be used in combination, for example, 1-octanol can be used in combination with 1-decanol. Terminating units derivable from aliphatic alcohols can improve the compatibility, increase the permanence, reduce exudation, and/or reduce extractability of the polyesters of the polymer blends disclosed herein.

In some embodiments, the polyesters of the polymer blends disclosed herein comprise repeating units derivable from a substituted or unsubstituted $C_2$ to $C_{20}$ aliphatic diacid, a substituted or unsubstituted $C_2$ to $C_{10}$ aliphatic diacid, a substituted or unsubstituted $C_4$ to $C_8$ aliphatic diacid, and/or a substituted or unsubstituted $C_4$ to $C_6$ aliphatic diacid; repeating units derivable from a substituted or unsubstituted $C_2$ to $C_{20}$ aliphatic diol, a substituted or unsubstituted $C_2$ to $C_{10}$ aliphatic diol, a substituted or unsubstituted $C_2$ to $C_6$ aliphatic diol, and/or a substituted or unsubstituted $C_2$ to $C_4$ aliphatic diol; and one or two terminator units derivable from a substituted or unsubstituted $C_1$ to $C_{20}$ aliphatic alcohol, a substituted or unsubstituted $C_2$ to $C_{18}$ aliphatic alcohol, a substituted or unsubstituted $C_4$ to $C_{14}$ aliphatic alcohol, and/or a substituted or unsubstituted $C_6$ to $C_{12}$ aliphatic alcohol.

In some embodiments, the polyesters of the polymer blends disclosed herein comprise repeating units derivable from succinic acid, glutaric acid, adipic acid, and/or sebacic acid. In some embodiments, the polyesters of the polymer blends disclosed herein comprise repeating units derivable from 1,3-propanediol and/or 1,2-propanediol. In some embodiments, the polyesters of the polymer blends disclosed herein comprise one or two terminator units derivable from 1-octanol, 1-decanol, and/or mixtures thereof. In some embodiments, the polyesters of the polymer blends disclosed herein comprise repeating units derivable from succinic acid, glutaric acid, adipic acid, and/or sebacic acid; repeating units derivable from 1,3-propanediol and/or 1,2-propanediol; and one or two terminator units derivable from 1-octanol, 1-decanol, and/or mixtures thereof.

In some embodiments, the polyesters of the polymer blends disclosed herein can be obtained by esterification of the corresponding aliphatic diacids with the aliphatic diols and aliphatic alcohols. The polyester can be prepared by allowing the diol to react with the diacid in a first step for a first period of time, and adding the alcohol in a second step whereby the alcohol is allowed to react with the diacid for a second period of time. Alternatively, a mixture comprising the diacid, the diol and the alcohol can be allowed to react to form the polyester in a single step. Other known methods for preparing polyesters also can be used.

In some embodiments, the polyester of the polymer blends has a formula I:

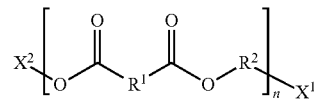

wherein n is 1 to 1000; $R^1$ is selected from the group consisting of a covalent bond and a substituted or unsubstituted aliphatic hydrocarbon group having 1 to 18 carbon atoms; $R^2$ is a substituted or unsubstituted aliphatic hydrocarbon group having 1 to 20 carbon atoms; $X^1$ is selected from the group consisting of —OH, —$O_2C$—$R^1$—$CO_2H$, and —$O_2C$—$R^1$—$CO_2R^3$; $X^2$ is selected from the group consisting of —H, —$R^2$—OH, and $R^3$; and $R^3$ is a substituted or unsubstituted aliphatic hydrocarbon group having 1 to 20 carbon atoms. In some embodiments, the polyester has a formula I as defined above with the proviso that if $X^1$ is —OH or —$O_2C$—$R^1$—$CO_2H$, then $X^2$ is $R^3$.

In some embodiments, n is 1 to 900, for example, 1 to 800, 1 to 700, 1 to 600, 1 to 500, 1 to 400, 1 to 300, 1 to 200, 1 to 100, 2 to 90, 2 to 80, 2 to 70, 2 to 60, 2 to 50, 2 to 45, 2 to 40, 2 to 35, 2 to 30, 2 to 25, 2 to 20, 3 to 20, 4 to 19, 5 to 18, 6 to 17, 7 to 16, 8 to 15, 9 to 14, 10 to 13, and/or 11 to 12.

In some embodiments, $R^1$, $R^2$, and/or $R^3$ are alkyl groups. $R^1$ alkyl groups can have, for example, from 1 to 18 carbon atoms, from 1 to 10 carbon atoms, from 1 to 8 carbon atoms, from 2 to 7 carbon atoms, from 2 to 6 carbon atoms, from 2 to 5 carbon atoms, from 2 to 4 carbon atoms, and/or 3 carbon atoms. $R^1$, for example, can be selected from the group consisting of —$(CH_2)_2$—, —$(CH_2)_3$—, —$(CH_2)_4$—, and —$(CH_2)_8$—. $R^2$ alkyl groups can have, for example, from 1 to 20 carbon atoms, from 1 to 10 carbon atoms, from 1 to 8 carbon atoms, from 2 to 7 carbon atoms, from 2 to 6 carbon atoms, from 2 to 5 carbon atoms, from 2 to 4 carbon atoms, and/or 3 carbon atoms. $R^2$, for example, can be selected from the group consisting of —(CH$_2$)$_3$—, —CH$_2$CH(CH$_3$)—, and —CH(CH$_3$)CH$_2$—. $R^3$ alkyl groups can have, for example, from 1 to 20 carbon atoms, from 1 to 18 carbon atoms, from 2 to 16 carbon atoms, from 3 to 14 carbon atoms, from 4 to 12 carbon atoms, from 6 to 12 carbon atoms, from 8 to 12 carbon atoms, and/or from 8 to 10 carbon atoms. $R^3$, for example, also can be a mixture comprising —(CH$_2$)$_7$CH$_3$ and —(CH$_2$)$_9$CH$_3$.

In some embodiments, $R^1$ is an alkyl group having from 1 to 10 carbons, $R^2$ is an alkyl group having from 1 to 10 carbons, and $R^3$ is an alkyl group having from 1 to 20 carbons. In other embodiments, $R^1$ is an alkyl group having from 2 to 6 carbons, $R^2$ is an alkyl group having from 2 to 6 carbons, and $R^3$ is an alkyl group having from 8 to 12 carbons. In still other embodiments, $R^1$ is an alkyl group having from 2 to 4 carbons, $R^2$ is an alkyl group having from 2 to 3 carbons, and $R^3$ is an alkyl group having from 8 to 10 carbons. In yet other embodiments, $R^1$ is selected from the group consisting of —(CH$_2$)$_2$—, —(CH$_2$)$_3$—, —(CH$_2$)$_4$—, and —(CH$_2$)$_8$—, $R^2$ is selected from the group consisting of —(CH$_2$)$_3$—, —CH$_2$CH(CH$_3$)—, and —CH(CH$_3$)CH$_2$—, and $R^3$ is a mixture comprising —(CH$_2$)$_7$CH$_3$ and —(CH$_2$)$_9$CH$_3$.

The polyesters disclosed herein can have a number average molecular weight of about 150 to about 150,000 g/mol, for example, about 200 to about 100,000 g/mol, about 300 to about 50,000 g/mol, about 400 to about 10,000 g/mol, about 500 to about 7,000 g/mol, about 600 to about 6,000 g/mol, about 700 to about 5,000 g/mol, about 800 to about 4,000 g/mol, about 900 to about 3,000 g/mol, and/or about 1,000 to about 2,000 g/mol. The polyesters also can have a number average molecular weight less about 150 g/mol or greater than about 150,000 g/mol.

The polyesters disclosed herein can have an acid value of about zero to about 20, for example, about 0.001 to about 10, about 0.01 to about 7, about 0.05 to about 5, about 0.1 to about 3, about 0.2 about 2, about 0.3 to about 1, about 2 to about 20, about 5 to about 20, about 8 to about 20, about 10 to about 20, and/or about 12 to about 18. The polyesters also can have an acid value greater than about 20. The acid value of the polyesters can be determined by known methods for measuring the number of milligrams of potassium hydroxide necessary to neutralize the free acids in one gram of polyester sample.

The polyesters disclosed herein can have a hydroxyl value of about zero to about 110, for example, about 1 to about 40, about 10 to about 30, about 15 to about 25, about 30 to about 110, about 40 to about 110, about 50 to about 110, and/or about 60 to about 90. The polyesters also can have a hydroxyl value greater than about 110. The hydroxyl value of the polyesters can be determined by known methods for measuring hydroxyl groups, such as the methods described by ASTM Test Method D 4274.

The polyesters disclosed herein are combined with one or more biopolymers to form a polymer blend having increased flexibility compared to the flexibility of the biopolymer in the absence of added polyester. The flexible polymer blends demonstrate, for example, reduced glass transition temperatures, increased elongation at break, reduced tensile strength, and/or reduced tensile at break compared to the corresponding properties of the biopolymer.

The biopolymers according to the disclosure include polymers generated from renewable natural sources and/or biodegradable polymers. Exemplary biopolymers include, but are not limited to, polylactic acid (e.g., BIO-FLEX, available from FKuR Kunststoff GmbH, Germany; ECOLOJU, available from Mitsubishi Plastics, Inc., Japan; HYCAIL, available from Hycail, the Netherlands; INGEO 2002D, available from NatureWorks LLC, Minnetonka, Minn.), polyhydroxybutyrate (e.g., BIOMER L, available from Biomer, Germany), polyvinyl alcohol (e.g., BIOSOL, available from Panteco, Italy; GOHSENOL, available from Nippon Gohsei, Japan; MAVINSOL, available from Panteco, Italy; MOWIOL, available from Kuraray America, Inc., Houston, Tex.; KURARAY POVAL, available from Kuraray America, Inc., Houston, Tex.), polybutylene succinate (e.g., GREEN PLASTICS, available from Mitsubishi, Japan), polyhydroxyalkanoates (e.g., MIREL, available from Telles (Metabolix and Archer Daniels Midland Company), Lowell, Mass.), polycaprolactones (e.g., CAPA, available from Solvay, United Kingdom), copolyesters (e.g, CADENCE, available from Eastman, Kingsport, Tenn.), aliphatic-aromatic copolyesters (e.g., EASTAR, available from Eastman, Kingsport, Tenn.; ECOFLEX, available from BASF, Germany), starches (e.g., BIOPLAST, available from Biotec, Germany; BIOPAR, available from BIOP Biopolymer Technologies AG, Dresden, Germany; CEREPLAST COMPOSTABLES and CEREPLAST HYBRID RESINS, available from Cereplast, Hawthorne, Calif.; COHPOL, available from VTT Chemical Technology, Finland; ECOPLAST, available from Groen Granulaat, the Netherlands; EVERCORN, available from Japan Corn Starch Co., Japan; MATER-BI, available from Novamont, Italy; PLANTIC, available from Plantic Technologies Limited, Victoria, Australia; SOLANYL, available from Rodenburg Polymers, the Netherlands; SORONA, available from DuPont, Wilmington, Del.; RE-NEW 400, available from StarchTech, Golden Valley, Minn.; TERRATEK, available from MGP Ingredients, Atchison, Kans.; VEGEMAT, available from Vegeplast, France), celluloses (e.g., BIOGRADE, available from FKuR Kunststoff GmbH, Germany), other biopolymers (e.g., LUNARE SE, available from Nippon Shokubai, Japan), and mixtures thereof. A preferred biopolymer is polylactic acid.

The amount of polyester in the polymer blend can be from about 5 to about 30 parts by weight per hundred parts by weight of the biopolymer (phr), for example, from about 8 to about 25 phr, from about 10 to about 20 phr, and/or from about 12 to about 18 phr. The amount of the polyester in the polymer blend also can be less than about 5 phr or greater than 30 phr.

The polymer blends disclosed herein comprising a biopolymer and an aliphatic polyester have improved flexibility compared to the biopolymer itself. The polymer blends disclosed herein demonstrate, for example, reduced glass transition temperatures, increased elongation percentages at break, reduced tensile strength, and/or reduced tensile at break.

The polymer blends disclosed herein can have at least a 5% reduction in glass transition temperature compared to the glass transition temperature of the biopolymer itself. For example, the polymer blends disclosed herein can have at least a 10%, at least a 15%, at least a 20%, at least a 25%, at least a 30%, at least a 40%, at least a 50%, at least a 60%, and/or at least a 75% reduction in glass transition temperature compared to the glass transition temperature of the biopolymer itself. The polymer blends also can have less than a 5% reduction in glass transition temperature, or greater than a 75% reduction in glass transition temperature compared to the glass transition temperature of the biopolymer itself. The polymer blends can have various glass transition temperatures, for example, about 10° C. to about 60° C., about 15° C. to about 50° C., about 20° C. to about 40° C., about 25° C. to about 35° C., and/or about 27° C. to about 33° C. The polymer blends also can have glass transition temperatures less than 10° C. and greater than 60° C.

The polymer blends disclosed herein can have at least a 2-fold increase in elongation percentage at break compared to the elongation percentage at break of the biopolymer itself. For example, the polymer blends disclosed herein can have at least a 3-fold, at least a 4-fold, at least a 5-fold, at least a 10-fold, at least a 20-fold, at least a 30-fold, at least a 40-fold, at least a 50-fold, at least a 60-fold, at least a 70-fold, at least a 80-fold, at least a 90-fold, at least a 100-fold, at least a 150-fold, and/or at least a 200-fold increase in elongation percentage at break compared to the elongation percentage at break of the biopolymer itself. The polymer blends also can have less than a 2-fold increase in elongation percentage at break, or greater than a 200-fold increase in elongation percentage at break compared to the elongation percentage at break of the biopolymer itself. The polymer blends can have various elongation percentages at break, for example, at least 10%, at least 15%, at least 20%, at least 25%, at least 30%, at least 40%, at least 50%, at least 60%, at least 70%, at least 80%, at least 90%, at least 100%, at least 120%, at least 140%, at least 160%, at least 180%, and/or at least 200%. The polymer blends also can have elongation percentages at break less than 10% or greater than 200%.

The polymer blends disclosed herein can have at least a 5% reduction in tensile strength (modulus) compared to the tensile strength of the biopolymer itself. For example, the polymer blends disclosed herein can have at least a 10%, at least a 15%, at least a 20%, at least a 25%, at least a 30%, at least a 40%, and/or at least a 50% reduction in tensile strength compared to the tensile strength of the biopolymer itself. The polymer blends also can have less than a 5% reduction in tensile strength or greater than a 50% reduction in tensile strength compared to the tensile strength of the biopolymer itself. The polymer blends can have various tensile strengths, for example, about 10 MPa to about 60 MPa, about 15 MPa to about 50 MPa, about 20 MPa to about 45 MPa, about 25 MPa to about 40 MPa, and/or about 30 MPa to about 35 MPa. The polymer blends also can have tensile strengths less than 10 MPa and greater than 60 MPa.

The polymer blends disclosed herein can have at least a 5% reduction in tensile at break compared to the tensile at break of the biopolymer itself. For example, the polymer blends disclosed herein can have at least a 10%, at least a 15%, at least a 20%, at least a 25%, at least a 30%, at least a 40%, and/or at least a 50% reduction in tensile at break compared to the tensile at break of the biopolymer itself. The polymer blends also can have less than a 5% reduction in tensile at break or greater than a 50% reduction in tensile at break compared to the tensile at break of the biopolymer itself. The polymer blends can have various tensile values at break, for example, about 10 MPa to about 60 MPa, about 15 MPa to about 50 MPa, about 20 MPa to about 45 MPa, about 25 MPa to about 40 MPa, and/or about 30 MPa to about 35 MPa. The polymer blends also can have tensile values at break less than 10 MPa and greater than 60 MPa.

The polymer blends disclosed herein demonstrate stability upon storage. In particular, the polyesters of the polymer blends disclosed herein demonstrate resistance to exudation (bleeding) for at least about 10 days of storage, for example, for at least about 20 days, at least about 30 days, at least about 50 days, at least about 70 days, at least about 90 days, at least about 120 days, at least about 150 days, at least about 180 days, at least about 210 days, at least about 250 days, and/or at least about 270 days or longer.

Another aspect of the present invention provides methods for increasing the flexibility of a biopolymer comprising mixing a biopolymer (e.g., polylactic acid) and a polyester. The polyester comprises repeating units derivable from a substituted or unsubstituted aliphatic diacid, repeating units derivable from a substituted or unsubstituted aliphatic diol, and one or two terminator units derivable from a substituted or unsubstituted aliphatic alcohol. In some embodiments the diacid is a $C_2$ to $C_{10}$ aliphatic diacid, the diol is a $C_2$ to $C_{10}$ aliphatic diol, and the alcohol is a $C_1$ to $C_{20}$ aliphatic alcohol.

Another aspect of the present invention provides methods for reducing the glass transition temperature of a biopolymer comprising mixing a biopolymer (e.g., polylactic acid) and a polyester. The polyester comprises repeating units derivable from a substituted or unsubstituted aliphatic diacid, repeating units derivable from a substituted or unsubstituted aliphatic diol, and one or two terminator units derivable from a substituted or unsubstituted aliphatic alcohol. In some embodiments the diacid is a $C_2$ to $C_{10}$ aliphatic diacid, the diol is a $C_2$ to $C_{10}$ aliphatic diol, and the alcohol is a $C_1$ to $C_{20}$ aliphatic alcohol.

Another aspect of the present invention provides methods for increasing the elongation at break of a biopolymer comprising mixing a biopolymer (e.g., polylactic acid) and a polyester. The polyester comprises repeating units derivable from a substituted or unsubstituted aliphatic diacid, repeating units derivable from a substituted or unsubstituted aliphatic diol, and one or two terminator units derivable from a substituted or unsubstituted aliphatic alcohol. In some embodiments the diacid is a $C_2$ to $C_{10}$ aliphatic diacid, the diol is a $C_2$ to $C_{10}$ aliphatic diol, and the alcohol is a $C_1$ to $C_{20}$ aliphatic alcohol.

Another aspect of the present invention provides methods for reducing the tensile strength of a biopolymer comprising mixing a biopolymer (e.g., polylactic acid) and a polyester. The polyester comprises repeating units derivable from a substituted or unsubstituted aliphatic diacid, repeating units derivable from a substituted or unsubstituted aliphatic diol, and one or two terminator units derivable from a substituted or unsubstituted aliphatic alcohol. In some embodiments the diacid is a $C_2$ to $C_{10}$ aliphatic diacid, the diol is a $C_2$ to $C_{10}$ aliphatic diol, and the alcohol is a $C_1$ to $C_{20}$ aliphatic alcohol.

Another aspect of the present invention provides methods for reducing tensile at break of a biopolymer comprising mixing a biopolymer (e.g., polylactic acid) and a polyester. The polyester comprises repeating units derivable from a substituted or unsubstituted aliphatic diacid, repeating units derivable from a substituted or unsubstituted aliphatic diol, and one or two terminator units derivable from a substituted or unsubstituted aliphatic alcohol. In some embodiments the diacid is a $C_2$ to $C_{10}$ aliphatic diacid, the diol is a $C_2$ to $C_{10}$ aliphatic diol, and the alcohol is a $C_1$ to $C_{20}$ aliphatic alcohol.

The disclosure may be better understood by reference to the following examples which are not intended to be limiting, but rather only set forth exemplary embodiments in accordance with the disclosure.

EXAMPLES

Example 1

Preparation of Blends of PLA and Petroleum-Based Esters

Polymer blends of polylactic acid (PLA) with various commercially available petroleum-based esters were prepared by combining INGEO 2002D polylactide resin (NatureWorks LLC) with 5 or 10 parts by weight per hundred parts by weight resin (phr) of the petroleum-based ester, as shown in Table 1.

TABLE 1

| | PLA blend | | | | | | | |
|---|---|---|---|---|---|---|---|---|
| | 1 | 2 | 3 | 4 | 5 | 6 | 7 | 8 |
| INGEO 2002D | 100.0 | 100.0 | 100.0 | 100.0 | 100.0 | 100.0 | 100.0 | 100.0 |
| PARAPLEX A-8200 Polyester Adipate | 5.0 | 10.0 | — | — | — | — | — | — |
| PARAPLEX G-40 Polyester Adipate | — | — | 5.0 | 10.0 | — | — | — | — |
| PLASTHALL P-550 Polyester Glutarate | — | — | — | — | 5.0 | 10.0 | — | — |
| PLASTHALL P-7092 Polyester Glutarate | — | — | — | — | — | — | 5.0 | 10.0 |
| Compatibility | Exudes | Exudes | Exudes | Exudes | Not compatible | Not compatible | Not compatible | Not compatible |

Two polyester adipates (PARAPLEX A-8200 and PARAPLEX G-40) were readily incorporated into the PLA. However, upon cooling to a solid state, both esters exuded from the PLA. Two polyester glutarates (PLASTHALL P-550 and PLASTHALL P-7092) were incompatible with PLA. The two polyester adipates and two polyester glutarates tested in this example had low acid values (less than 2.0) and low hydroxyl values (less than 25).

Example 2

Preparation of Polyesters A1 to A6

Polyesters A1 to A6 were prepared using a dicarboxylic acid, a diol, and a mixture of C8 and C10 alcohols as indicated in Table 2. The dicarboxylic acids used were succinic acid, glutaric acid, and adipic acid. The diols used were 1,2-propanediol and 1,3-propanediol. The specifications for the mixture of the C8 (caprylic) and C10 (decyl) alcohols are as follows: hydroxyl value: 380-390; acid value: 0.05 max; iodine value: 0.05 max; moisture: 0.1% max; color, APHA: 10 max; appearance: clear. The composition (percent) by gas chromatography of the C8-C10 alcohol mixture was as follows: C6 (hexyl): 1.0 max; C8 (caprylic): 39-46.5; C10 (decyl): 52-56.5; C12 (lauryl): 0.5 max; hydrocarbon: 1.0 max.

The following general procedure was used to prepare polyesters having a high hydroxyl value and a high acid value. First, the diacid, diol, and mixture of C8-C10 alcohol were loaded into a flask equipped with a condenser. The flask was heated slowly to a temperature of about 310 to 420° F., and the overhead temperature was controlled to keep the reactants in the flask. When the desired hydroxyl and acid values had been obtained, the reaction mixture was cooled to room temperature.

The following general procedure was used to prepare polyesters having a low hydroxyl value and a low acid value. First, the diacid, diol, and mixture of C8-C10 alcohol were loaded into a flask equipped with a condenser. The flask was heated slowly to a temperature of about 310 to 420° F., and the overhead temperature was controlled to keep the reactants in the flask. When the reaction was over 90% complete, a tin-containing catalyst such as monobutyltin oxide was added. The reaction was placed under vacuum (approximately 2 mm Hg) until the desired hydroxyl and acid values had been obtained. The reaction mixture was then cooled to room temperature.

High hydroxyl values (greater than 50) and high acid values (greater than 10) were demonstrated by polyesters A1, A2, A3, and A6.

TABLE 2

| | Polyester | | | | | |
|---|---|---|---|---|---|---|
| | A1 | A2 | A3 | A4 | A5 | A6 |
| Dicarboxylic Acid | Adipic acid | Glutaric acid | Succinic acid | Succinic acid | Succinic acid | Succinic acid |
| %, weight | 59.30 | 56.80 | 54.10 | 53.40 | 53.40 | 54.65 |
| Diol | 1,3-propanediol | 1,3-propanediol | 1,2-propanediol | 1,2-propanediol | 1,3-propanediol | 1,3-propanediol |
| %, weight | 33.80 | 35.80 | 38.00 | 36.50 | 36.50 | 41.00 |
| Alcohol terminator | C8-C10 | C8-C10 | C8-C10 | C8-C10 | C8-C10 | C8-C10 |
| %, weight | 6.90 | 7.40 | 7.90 | 10.1 | 10.1 | 4.35 |
| Mol. weight, theoretical | 650-700 | 700-750 | 650-700 | 750-800 | 750-800 | 600-650 |
| Molecular weight by GPC, Mn | 1632 | 1959 | 1129 | 1791 | 2699 | 1282 |
| Acid value, mg KOH | 13.1 | 16.9 | 14.0 | 0.32 | 0.31 | 11.8 |

TABLE 2-continued

| | Polyester | | | | | |
|---|---|---|---|---|---|---|
| | A1 | A2 | A3 | A4 | A5 | A6 |
| Appearance | Hazy | Hazy | Slt hazy | Slt opal. | Clear | Hazy |
| Color, APHA (Gardner) | 16 | (1.9) | (2.3) | (3) | 550 | 152 |
| Hydroxyl Value (wet) | 72 | 52 | 101.7 | 27.5 | 26 | 72 |
| Saponification Value | 550.5 | 517 | 619 | 637 | 667.4 | 550.5 |
| Moisture, % | 0.01 | 0.08 | 0.08 | 0.01 | 0.01 | 0.01 |
| Specific Gravity @25° C. | 1.0762 | 1.151 | 1.1827 | 1.1802 | 1.2196 | 1.0762 |
| Refractive Index @25° C. | 1.4703 | 1.4694 | 1.4632 | 1.4659 | 1.4734 | 1.4703 |
| Viscosity @25° C., cps | 3436 | 2623 | 13560 | 47600 | 37951 | 3436 |

Example 3

Preparation of Blends of PLA and Renewably-Based Esters

Polymer blends of polylactic acid (PLA) with various renewably-based esters (described in Example 2) were prepared by combining INGEO 2002D polylactide resin (NatureWorks LLC) with 10, 20, or 30 parts by weight per hundred parts by weight resin (phr) of the renewably-based ester, as shown in Table 3. The polyesters were prepared using renewably-sourced 1,3-propanediol and renewably-sourced C8-C10 alcohol mixture. The dicarboxylic acids used were succinic acid, glutaric acid, and adipic acid. The polyesters tested in this example (polyesters A1, A2, and A6) demonstrated high hydroxyl values (greater than 50) and high acid values (greater than 10).

TABLE 3

| | PLA Blend | | | | | | | | | |
|---|---|---|---|---|---|---|---|---|---|---|
| | 9 | 10 | 11 | 12 | 13 | 14 | 15 | 16 | 17 | PLA |
| INGEO 2002D | 100.0 | 100.0 | 100.0 | 100.0 | 100.0 | 100.0 | 100.0 | 100.0 | 100.0 | 100.0 |
| Polyester A6 (succinic acid, 1,3-propanediol) | 10.0 | 20.0 | 30.0 | — | — | — | — | — | — | — |
| Polyester A1 (adipic acid, 1,3-propanediol) | — | — | — | 10.0 | 20 | 30.0 | — | — | — | — |
| Polyester A2 (glutaric acid, 1,3-propanediol) | — | — | — | — | — | — | 10.0 | 20.0 | 30.0 | — |
| Compatibility Yes (Y)/No (N) | Y | Y | N | Y | Y | N | Y | Y | N | — |
| Plasticizer Neat Physical Properties | | | | | | | | | | |
| Acid Value, mg KOH | 11.8 | 11.8 | 11.8 | 13.1 | 13.1 | 13.1 | 16.9 | 16.9 | 16.9 | — |
| Hydroxyl Value | 78 | 78 | 78 | 72 | 72 | 72 | 52 | 52 | 52 | — |
| Original Physical Properties | | | | | | | | | | |
| Tensile Strength, MPa | 36.0 | 35.2 | — | 29.2 | 29.0 | — | 32.5 | 25.9 | — | 45.8 |
| psi | 5225 | 5110 | — | 4230 | 4200 | — | 4715 | 3755 | — | 6645 |
| Tensile at Break, MPa | 36.0 | 35.2 | — | 21.2 | 23.9 | — | 32.5 | 23.2 | — | 45.8 |
| psi | 5225 | 5110 | — | 3075 | 3465 | — | 4715 | 3360 | — | 6645 |
| Elongation @ Break, % | 0 | 0 | — | 10 | 270 | — | 0 | 136 | — | 2 |
| Hardness Duro D, pts. | 78 | 79 | — | 60 | 65 | — | 80 | 65 | — | 77 |
| DSC ASTM D3418-03 10° C./minute | | | | | | | | | | |
| Tm, ° C. first heat data | 122.7 | 92.2 | — | 114.8 | 93.4 | — | 106.4 | 93.2 | — | 151 |
| Tc, ° C. second heat data | 150.4, 152.4 | 138.7, 150.2 | — | 146.7 | 139.6, 150.2 | — | 144.4, 152.6 | 151.4 | — | UD |

TABLE 3-continued

| | PLA Blend | | | | | | | | | |
|---|---|---|---|---|---|---|---|---|---|---|
| | 9 | 10 | 11 | 12 | 13 | 14 | 15 | 16 | 17 | PLA |
| Tg, ° C. second heat data | 44.4 | 36.2 | — | 44.7 | 33.0 | — | 45.1 | 35.7 | — | 60 |
| Compound Stability, days to exudation | >270 | >270 | — | >270 | 150 | — | >90 | >90 | — | — |

The polyesters tested (polyesters A1, A2, and A6) were compatible with PLA at 10 and 20 phr, but were incompatible at 30 phr. The compatible PLA/polyester polymer blends demonstrated a reduction in Tg compared to PLA alone (from 33.0° C. to 45.1° C. for the PLA blends, compared to 60° C. for unmodified PLA). Polymer blend 13 (polyester A1 at 20 phr) demonstrated a large improvement in flexibility, as determined by increased elongation at break (270% compared to 2% for unmodified PLA), reduced tensile strength (29.0 MPa compared to 45.8 MPa for unmodified PLA), and reduced tensile at break (23.9 MPa compared to 45.8 MPa for unmodified PLA). Similarly, polymer blend 16 (polyester A2 at 20 phr) demonstrated significantly improved flexibility, as determined by increased elongation at break (136% compared to 2% for unmodified PLA), reduced tensile strength (25.9 MPa compared to 45.8 MPa for unmodified PLA), and reduced tensile at break (23.2 MPa compared to 45.8 MPa for unmodified PLA).

Stability of the polymer blends was assessed by determining the days to exudation of the polyester at 25° C. and 55% relative humidity. The polyester included in polymer blend 13 exuded after approximately 5 months. The polyesters included in polymer blends 9, 10, and 12 were stable for over nine months, and the polyesters included in polymer blends 15 and 16 were stable for over three months.

Example 4

Preparation of Blends of PLA and Succinate Esters

Polymer blends of polylactic acid (PLA) with renewably-based succinate esters (described in Example 2) were prepared by combining INGEO 2002D polylactide resin (NatureWorks LLC) with 10, 20, or 30 parts by weight per hundred parts by weight resin (phr) of the succinate ester, as shown in Table 4. The renewably-based succinate esters (polyesters A3 and A4) were prepared using succinic acid, 1,2-propanediol, and a C8-C10 alcohol mixture. Polyester A3 demonstrated a high hydroxyl value (greater than 50) and high acid value (greater than 10), whereas polyester A4 demonstrated a hydroxyl value of 27.5 and an acid value of 0.32.

TABLE 4

| | PLA Blend | | | | | |
|---|---|---|---|---|---|---|
| | 18 | 19 | 20 | 21 | 22 | 23 |
| INGEO 2002D | 100.0 | 100.0 | 100.0 | 100.0 | 100.0 | 100.0 |
| Polyester A4 (succinic acid, 1,2-propanediol) | 10.0 | 20.0 | 30.0 | — | — | — |
| Polyester A3 (succinic acid, 1,2-propanediol) | — | — | — | 10.0 | 20.0 | 30.0 |
| Compatibility Yes (Y)/No (N) | Y | Y | Y | Y | Y | N |

TABLE 4-continued

| | PLA Blend | | | | | |
|---|---|---|---|---|---|---|
| | 18 | 19 | 20 | 21 | 22 | 23 |
| Plasticizer Neat Physical Properties | | | | | | |
| Acid Value, mg KOH | 0.32 | 0.32 | 0.32 | 14.0 | 14.0 | 14.0 |
| Hydroxyl Value | 27.5 | 27.5 | 27.5 | 101.7 | 101.7 | 101.7 |
| Original Physical Properties | | | | | | |
| Tensile Strength, MPa | 53.4 | 49.7 | 37.2 | 50.6 | 46.6 | — |
| psi | 7750 | 7215 | 5400 | 7335 | 6760 | — |
| Tensile at Break, Mpa | 53.4 | 49.7 | 28.6 | 50.6 | 15.7 | — |
| psi | 7750 | 7210 | 4145 | 7335 | 2270 | — |
| Elongation @ Break, % | 0 | 0 | 63 | 0 | 73 | — |
| Hardness Duro A, pts. | — | — | 92 | — | — | — |
| Hardness Duro D, pts. | 80 | 77 | 66 | 80 | 73 | — |
| DSC ASTM D3418-03 10° C./minute | | | | | | |
| Tm, ° C. first heat data | 118.5 | 118.9 | 103.7 | 108.1 | 99 | — |
| Tc, ° C. second heat data | 148.9 | 146.7 | 145.3 | 143.0, 151.2 | 1378, 149.3 | — |
| Tg, ° C. second heat data | 48.7 | 38.37 | 32.4 | 44.4 | 35.3 | — |
| Compound Stability, days to exudation | >250 | >120 | >120 | >90 | >90 | — |

The polyesters tested (polyesters A3 and A4) were compatible with PLA at 10 and 20 phr. Polyester A4 also was compatible with PLA at 30 phr, whereas polyester A3 was incompatible at 30 phr. The compatible the PLA/polyester polymer blends demonstrated a reduction in Tg compared to PLA alone (from 32.4° C. to 48.7° C. for the PLA blends, compared to 60° C. for unmodified PLA). Polymer blends 20 (polyester A4 at 30 phr) and 22 (polyester A3 at 20 phr) demonstrated increased elongation at break (63% for blend 20 and 73% for blend 22, compared to 2% for unmodified PLA). Polymer blend 20 additionally demonstrated reduced tensile strength (37.2 MPa compared to 45.8 MPa for unmodified PLA), and reduced tensile at break (28.6 MPa compared to 45.8 MPa for unmodified PLA).

Stability of the polymer blends was assessed by determining the days to exudation of the polyester at 25° C. and 55% relative humidity. The polyester included in polymer blend 18 was stable for over 250 days, the polyesters included in polymer blends 19 and 20 were stable for over four months, and the polyesters included in polymer blends 21 and 22 were stable for over three months.

Example 5

Preparation of Blends of PLA and Succinate Esters

Polymer blends of polylactic acid (PLA) with renewably-based succinate esters (described in Example 2) were prepared by combining INGEO 2002D polylactide resin (NatureWorks LLC) with 10, 20, or 30 parts by weight per hundred parts by weight resin (phr) of the succinate ester, as shown in Table 5. The renewably-based succinate esters (polyesters A3, A4, A5, and A6) were prepared using succinic acid, 1,2-propanediol or 1,3-propanediol, and a C8-C10 alcohol mixture. Polyesters A3 and A6 demonstrated high hydroxyl values (greater than 50) and high acid values (greater than 10).

The polyesters tested (polyesters A3, A4, A5, and A6) were compatible with PLA at 10 and 20 phr. Polyesters A4 and A5 also were compatible with PLA at 30 phr, but polyester A3 was incompatible at 30 phr. The compatible PLA/polyester polymer blends demonstrated a reduction in Tg compared to PLA alone (from 31.16° C. to 48.7° C. for the PLA blends, compared to 60° C. for unmodified PLA). Polymer blends 26 (polyester A5 at 30 phr), 20 (polyester A4 at 30 phr), and 22 (polyester A3 at 20 phr) demonstrated increased elongation at break (209% for blend 26, 63% for blend 20, and 73% for blend 22 compared to 2% for unmodified PLA). Polymer blends 26 and 20 additionally demonstrated both reduced tensile strength (20.9 MPa for blend 26 and 37.2 MPa for blend 20, compared to 45.8 MPa for unmodified PLA), and

TABLE 5

| | PLA Blend | | | | | | | | | | |
|---|---|---|---|---|---|---|---|---|---|---|---|
| | 9 | 10 | 24 | 25 | 26 | 18 | 19 | 20 | 21 | 22 | 23 |
| INGEO 2002D | 100.0 | 100.0 | 100.0 | 100.0 | 100.0 | 100.0 | 100.0 | 100.0 | 100.0 | 100.0 | 100.0 |
| Polyester A6 (succinic acid, 1,3-propanediol) | 10.0 | 20.0 | — | — | — | — | — | — | — | — | — |
| Polyester A5 (succinic acid, 1,3-propanediol) | — | — | 10.0 | 20.0 | 30.0 | — | — | — | — | — | — |
| Polyester A4 (succinic acid, 1,2-propanediol) | — | — | — | — | — | 10.0 | 20.0 | 30.0 | — | — | — |
| Polyester A3 (succinic acid, 1,2-propanediol) | — | — | — | — | — | — | — | — | 10.0 | 20.0 | 30.0 |
| Compatiblity Yes (Y)/No (N) | Y | Y | Y | Y | Y | Y | Y | Y | Y | Y | N |
| Plasticizer Neat Physical Properties | | | | | | | | | | | |
| Acid Value, mg KOH | 11.8 | 11.8 | 0.31 | 0.31 | 0.31 | 0.32 | 0.32 | 0.32 | 14.0 | 14.0 | 14.0 |
| Hydroxyl Value | 78 | 78 | 26 | 26 | 26 | 27.5 | 27.5 | 27.5 | 101.7 | 101.7 | 101.7 |
| Original Physical Properties | | | | | | | | | | | |
| Tensile Strength, MPa | 36.0 | 35.2 | 53.5 | 46.6 | 20.9 | 53.4 | 49.7 | 37.2 | 50.6 | 46.6 | — |
| psi | 5225 | 5110 | 7760 | 6765 | 3030 | 7750 | 7215 | 5400 | 7335 | 6760 | — |
| Tensile at Break, Mpa | 36.0 | 35.2 | 53.5 | 46.6 | 19.3 | 53.4 | 49.7 | 28.6 | 50.6 | 15.7 | — |
| psi | 5225 | 5110 | 7760 | 6765 | 2800 | 7750 | 7210 | 4145 | 7335 | 2270 | — |
| Elongation @ Break, % | 0 | 0 | 0 | 0 | 209 | 0 | 0 | 63 | 0 | 73 | — |
| Hardness Duro A, pts. | — | — | — | — | 86 | — | — | 92 | — | — | — |
| Hardness Duro D, pts. | 78 | 79 | 79 | 76 | 50 | 80 | 77 | 66 | 80 | 73 | — |
| DSC ASTM D3418-03 10° C./minute | | | | | | | | | | | |
| Tm, ° C. first heat data | 122.7 | 92.2 | 101.7 | 96.8 | 81.24 | 118.5 | 118.9 | 103.7 | 108.1 | 99 | — |
| Tc, ° C. second heat data | 150.4, 152.4 | 138.7, 150.2 | 148.7 | 142.8, 152.1 | 139.0, 150.4 | 148.9 | 146.7 | 145.3 | 143.0 151.2 | 137.8, 149.3 | — |
| Tg, ° C. second heat data | 44.4 | 36.2 | 46.7 | 37.1 | 31.16 | 48.7 | 38.37 | 32.4 | 44.4 | 35.3 | — |
| Compound Stability, days to exudation | >270 | >270 | >250 | >120 | 120 | >250 | >120 | >120 | >90 | >90 | none | reduced tensile at break (19.3 for blend 26 and 28.6 MPa for blend 20, compared to 45.8 MPa for unmodified PLA).

Stability of the polymer blends was assessed by determining the days to exudation of the polyester at 25° C. and 55% relative humidity. The polyesters included in polymer blends 9 and 10 were stable for over 270 days, the polyesters included in polymer blends 18 and 24 were stable for over 250 days, the polyesters included in polymer blends 19, 20, 25, and 26 were stable for over four months, and the polyesters included in polymer blends 21 and 22 were stable for over three months.

Example 6

Preparation of Polyesters A7 to A13

Polyesters A7 to A13 were prepared using a dicarboxylic acid, a diol, and a mixture of C8 and C10 alcohols as indicated in Table 6. The dicarboxylic acids used were glutaric acid and sebacic acid. The diols used were 1,2-propanediol and 1,3-propanediol. The specifications for the mixture of the C8 (caprylic) and C10 (decyl) alcohols are as follows: hydroxyl value: 380-390; acid value: 0.05 max; iodine value: 0.05 max; moisture: 0.1% max; color, APHA: 10 max; appearance: clear. The composition (percent) by gas chromatography of the C8-C10 alcohol mixture was as follows: C6 (hexyl): 1.0 max; C8 (caprylic): 39-46.5; C10 (decyl): 52-56.5; C12 (lauryl): 0.5 max; hydrocarbon: 1.0 max.

The polyesters were prepared according to the general procedures described in Example 2. High hydroxyl values (greater than 50) and high acid values (greater than 10) were demonstrated by polyesters A7, A11, and A13.

TABLE 6

| | Polyester | | | | | | |
|---|---|---|---|---|---|---|---|
| | A7 | A8 | A9 | A10 | A11 | A12 | A13 |
| Dicarboxylic Acid | Glutaric acid | Glutaric acid | Glutaric acid | Sebacic acid | Sebacic acid | Sebacic acid | Sebacic acid |
| %, weight | 56.8 | 56.8 | 56.8 | 64.0 | 64.0 | 64.0 | 64.0 |
| Diol | 1,2-propanediol | 1,2-propanediol | 1,3-propanediol | 1,2-propanediol | 1,2-propanediol | 1,3-propanediol | 1,2-propanediol |
| %, weight | 35.8 | 35.8 | 35.8 | 27.6 | 27.6 | 27.6 | 27.6 |
| Alcohol terminator | C8-C10 | C8-C10 | C8-C10 | C8-C10 | C8-C10 | C8-C10 | C8-C10 |
| %, weight | 7.4 | 7.4 | 7.4 | 8.4 | 8.4 | 8.4 | 8.4 |
| Molecular weight by GPC, Mn | 1181 | 2531 | 4849 | 3413 | 1285 | 3761 | 1328 |
| Acid value, mg KOH | 15.9 | 1.83 | 1.1 | 0.28 | 14.8 | 0.2 | 15.0 |
| Appearance | Hazy | Hazy | Hazy | Slight opaque | Slight opaque | Solid | Solid |
| Color, APHA (Gardner) | (3.0) | (3.7) | (5.6) | (1.1) | (1.2) | (1.1) | (0.9) |
| Hydroxyl Value (wet) | 81.6 | 13.7 | 4.5 | 11.7 | 84 | 13.2 | 82.1 |
| Saponification Value | 536.5 | 588.1 | 522.5 | 439.5 | 407 | 441.5 | 410 |
| Moisture, % | 0.01 | 0.03 | 0.01 | 0.01 | 0.01 | 0.08 | 0.04 |
| Specific Gravity @25° C. | 1.137 | 1.151 | 1.1530 | 1.0442 | 1.0364 | 1.044 | 1.036 |
| Refractive Index @25° C. | 1.4627 | 1.4654 | 1.4707 | 1.4652 | 1.4620 | 1.4950 | 1.4660 |
| Viscosity @25° C., cps | 1422 | 9343 | 27144 | 6315 | 649 | Solid | Solid |

Example 7

Preparation of Blends of PLA and Adipate, Glutarate, or Sebacate Esters

Polymer blends of polylactic acid (PLA) with adipate, glutarate, or renewably-based sebacate esters (described in Example 6) were prepared by combining INGEO 2002D polylactide resin (NatureWorks LLC) with 10, 20, or 30 parts by weight per hundred parts by weight resin (phr) of the adipate, glutarate, or sebacate ester, as shown in Tables 7 and 8. The renewably-based glutarate and sebacate esters (polyesters A7-A13) were prepared using glutaric acid or sebacic acid, 1,2-propanediol or 1,3-propanediol, and a C8-C10 alcohol mixture. Polyesters A7, A11, and A13 demonstrated high hydroxyl values (greater than 50) and high acid values (greater than 10). Commercially available DIOPLEX 400 polyester adipate demonstrated a high acid value (greater than 10) and a hydroxyl value of 25, whereas PARAPLEX G-57 polyester adipate demonstrated a low acid value (less than 2.0) and low hydroxyl value (less than 25).

TABLE 7

| | PLA Blend | | | | | | | | |
|---|---|---|---|---|---|---|---|---|---|
| | 27 | 28 | 29 | 30 | 31 | 32 | 33 | 34 | 35 |
| INGEO 2002D | 100.0 | 100.0 | 100.0 | 100.0 | 100.0 | 100.0 | 100.0 | 100.0 | 100.0 |
| DIOPLEX 400 Polyester Adipate | 10.0 | 20 | — | — | — | — | — | — | — |
| PARAPLEX G-57 Polyester Adipate | — | — | 10.0 | 20 | — | — | — | — | — |
| Polyester A7 (glutaric acid, 1,2-propanediol) | — | — | — | — | 10.0 | 20.0 | — | — | — |
| Polyester A8 (glutaric acid, 1,2-propanediol) | — | — | — | — | — | — | 10.0 | 20.0 | — |
| Polyester A9 (glutaric acid, 1,3-propanediol) | — | — | — | — | — | — | — | — | 10.0 |
| Compatibility Yes (Y)/No (N) | Y | N | Y | N | Y | Y | Y | Y | Y |
| Plasticizer Neat Physical Properties | | | | | | | | | |
| Acid Value, mg KOH | 23 | 23 | 1.5 | 1.5 | 15.9 | 15.9 | 1.83 | 1.83 | 1.1 |
| Hydroxyl Value | 25 | 25 | 21 | 21 | 81.6 | 81.6 | 13.7 | 13.7 | 4.5 |
| Original Physical Properties | | | | | | | | | |
| Tensile Strength, MPa | 51.4 | — | 46.2 | — | 50.6 | 27.9 | 42.3 | 37.5 | 44.1 |
| psi | 7460 | — | 6695 | — | 7340 | 4040 | 6140 | 5445 | 6390 |
| Tensile at Break, MPa | 51.4 | — | 46.2 | — | 50.6 | 23.4 | 42.3 | 33.2 | 44.1 |
| psi | 7460 | — | 6695 | — | 7340 | 3395 | 6140 | 4810 | 6390 |
| Elongation @ Break, % | 0 | — | 0 | — | 0 | 124 | 0 | 13 | 1 |
| Hardness Duro D, pts. | 76 | — | 75 | — | 80 | 66 | 78 | 78 | 65 |
| DSC ASTM D3418-03 10° C./minute | | | | | | | | | |
| Tm, ° C. first heat data | 94.6 | — | 110.4 | — | 103.98 | 103.9 | 103.23 | 111.0 | 109.4 |
| Tc, ° C. second heat data | 142.3, 152.3 | — | 145.1, 151.7 | — | 144.2, 152.1 | 142.3 | 145.4, 153.7 | 145.7 | 145.5, 153.3 |
| Tg, ° C. second heat data | 44.8 | — | 45.8 | — | 44.06 | 33.6 | 47.1 | 36.5 | 43.2 |
| Compound Stability, days to exudation | >67 | — | >67 | — | >67 | >58 | >67 | >58 | >58 |

TABLE 8

| PLA Blend | 36 | 37 | 38 | 39 | 40 |
|---|---|---|---|---|---|
| INGEO 2002D | 100.0 | 100.0 | 100.0 | 100.0 | 100.0 |
| Polyester A10 (sebacic acid, 1,2-propanediol) | 10.0 | 20 | — | — | — |
| Polyester A11 (sebacic acid, 1,2-propanediol) | — | — | 10 | — | — |
| Polyester A12 (sebacic acid, 1,3-propanediol) | — | — | — | 10 | — |
| Polyester A13 (sebacic acid, 1,2-propanediol) | — | — | — | — | 10 |
| Compatibility Y/N | Y | N | N | N | N |
| Plasticizer Neat Physical Properties | | | | | |
| Acid Value, mg KOH | 0.28 | 0.28 | 14.8 | 0.2 | 15.0 |
| Hydroxyl Value | 11.7 | 11.7 | 84 | 13.2 | 82.1 |
| Original Physical Properties | | | | | |
| Tensile Strength, MPa | 40.5 | — | — | — | — |
| psi | 5870 | — | — | — | — |
| Tensile at Break, Mpa | 36.2 | — | — | — | — |
| psi | 5245 | — | — | — | — |
| Elongation @ Break, % | 10 | — | — | — | — |
| Hardness Duro D, pts. | 70 | — | — | — | — |

TABLE 8-continued

| PLA Blend | 36 | 37 | 38 | 39 | 40 |
|---|---|---|---|---|---|
| DSC ASTM D3418-03 10° C./ minute | | | | | |
| Tm, ° C. first heat data | 121.7 | — | — | — | — |
| Tc, ° C. second heat data | 149.5 | — | — | — | — |
| Tg, ° C. second heat data | 54.7 | — | — | — | — |
| Compound Stability, days to exudation | >67 | — | — | — | — |

The commercially available polyester adipates (DIOPLEX 400 and PARAPLEX G-57) were compatible with PLA at 10 phr, but were incompatible at 20 phr. Polyester A10 (prepared from sebacic acid and 1,2-propanediol) also was compatible with PLA at 10 phr, but was incompatible at 20 phr. Additionally, the other sebacate polyesters tested in this example (polyesters A11, A12, and A13) were incompatible with PLA at 10 phr. In contrast, the glutarate polyesters tested in this example were compatible with PLA. Specifically, polyesters A7 and A8 were compatible at both 10 phr and 20 phr, and polyester A9 was compatible at 10 phr.

PLA/polyester polymer blends 27, 29, and 31-35 demonstrated a reduction in Tg compared to PLA alone (from 33.6° C. to 47.1° C. for the PLA blends, compared to 60° C. for unmodified PLA). Polymer blends 32 (polyester A7 at 20 phr) and 34 (polyester A8 at 20 phr) additionally demonstrated increased elongation at break (124% for blend 32 and 13% for blend 34, compared to 2% for unmodified PLA), reduced tensile strength (27.9 MPa for blend 32 and 37.5 MPa for blend 34, compared to 45.8 MPa for unmodified PLA), and reduced tensile at break (23.4 MPa for blend 32 and 33.2 MPa for blend 34, compared to 45.8 MPa for unmodified PLA).

Stability of the polymer blends was assessed by determining the days to exudation of the polyester at 25° C. and 55% relative humidity. The polyesters included in polymer blends 27, 29, 31, 33, and 36 were stable for over 67 days, and the polyesters included in polymer blends 32, 34, and 35 were stable for over 58 days.

While specific embodiments have been illustrated and described, numerous modifications come to mind without departing from the spirit of the invention and the scope of protection is only limited by the scope of the accompanying claims.

What is claimed is:

1. A method for increasing the flexibility of a biopolymer comprising mixing a biopolymer and a compatible polyester to form a polymer blend, wherein the polyester comprises repeating units derivable from succinic acid, repeating units derivable from a substituted or unsubstituted $C_2$ to $C_{20}$ aliphatic diol, and one or two terminator units derivable from a substituted or unsubstituted $C_1$ to $C_{20}$ aliphatic alcohol; wherein the polyester is present in an amount of about 5 to about 30 parts by weight per hundred parts by weight of the biopolymer; and wherein the polymer blend has at least a 10-fold increase in elongation percentage at break compared to the elongation percentage at break of the biopolymer.

2. A polymer blend comprising
(i) a biopolymer, and
(ii) a compatible aliphatic polyester comprising repeating units derivable from succinic acid; repeating units derivable from a substituted or unsubstituted $C_2$ to $C_{20}$ aliphatic diol; and one or two terminator units derivable from a substituted or unsubstituted $C_1$ to $C_{20}$ aliphatic alcohol; wherein the polyester is present in an amount of about 5 to about 30 parts by weight per hundred parts by weight of the biopolymer; and wherein the polymer blend has at least a 10-fold increase in elongation percentage at break compared to the elongation percentage at break of the biopolymer.

3. The polymer blend of claim 2, wherein the polyester has an acid value of about 8 to about 20 and a hydroxyl value of about 40 to about 110.

4. The polymer blend of claim 2, wherein the polyester has a number average molecular weight of about 400 to about 10,000 g/mol.

5. The polymer blend of claim 2, wherein the polyester has an acid value of zero to about 20.

6. The polymer blend of claim 2, wherein the polyester has an acid value of about 8 to about 20.

7. The polymer blend of claim 2, wherein the polyester has a hydroxyl value of about zero to about 110.

8. The polymer blend of claim 2, wherein the polyester has a hydroxyl value of about 40 to about 110.

9. The polymer blend of claim 2, wherein the biopolymer is selected from the group consisting of polylactic acid, polyhydroxybutyrate, polyvinyl alcohol, polybutylene succinate, polyhydroxyalkanoates, polycaprolactones, aliphatic-aromatic copolyesters, starches, celluloses, and mixtures thereof.

10. The polymer blend of claim 2, wherein the biopolymer is polylactic acid.

11. The polymer blend of claim 2, wherein the aliphatic diol is a substituted or unsubstituted $C_2$ to $C_{10}$ aliphatic diol.

12. The polymer blend of claim 2, wherein the aliphatic diol is a substituted or unsubstituted $C_2$ to $C_4$ aliphatic diol.

13. The polymer blend of claim 2, wherein the aliphatic diol is selected from the group consisting of aliphatic diols having 3 carbon atoms and aliphatic diols having 4 carbon atoms.

14. The polymer blend of claim 2, wherein the substituted or unsubstituted $C_1$ to $C_{20}$ aliphatic alcohol is selected from the group consisting of methanol, ethanol, propanol, butanol, pentanol, hexanol, heptanol, octanol, nonanol, decanol, undecanol, dodecanol, tridecanol, tetradecanol, pentadecanol, hexadecanol, heptadecanol, octadecanol, eicosanol, cis-9-dodecenol, cis-9-tetradecenol, cis-9-hexadecenol, cis-9-octadecenol, cis-cis-9,12-octadecadienol, cis-cis-cis-9,12,15-octadecatrienol, cis-trans-trans-9,11,13-octadecatrienol, octadecatetraenol, cis-11-eicosenol, eicosadienol, eicosatrienol, 5,8,11,14-eicosatetraenol, eicosapentaenol, cis-13-docosenol, docosatetraenol, 4,8,12,15,19-docosapentaenol, docosahexaenol, tetracosenol, 4,8,12,15,18,21-tetracosahexaenol, and mixtures thereof.

15. The polymer blend of claim 2, wherein the polymer blend has at least a 5% reduction in tensile strength compared to the tensile strength of the biopolymer and at least a 5% reduction in tensile at break compared to the tensile at break of the biopolymer.

16. The polymer blend of claim 2, wherein the aliphatic polyester has a formula I:

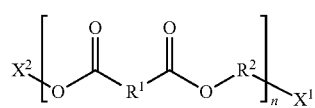

wherein n is 1 to 1000;

$R^1$ is —$(CH_2)_2$—;

$R^2$ is a substituted or unsubstituted aliphatic hydrocarbon group having 1 to 20 carbon atoms;

$X^1$ is selected from the group consisting of —OH, —$O_2C$—$R^1$—$CO_2H$, and —$O_2C$—$R^1$—$CO_2R^3$;

$X^2$ is selected from the group consisting of —H, —$R^2$—OH, and $R^3$; and $R^3$ is a substituted or unsubstituted aliphatic hydrocarbon group having 1 to 20 carbon atoms;

with the proviso that if $X^1$ is —OH or —$O_2C$—$R^1$—$CO_2H$, then $X^2$ is $R^3$.

17. The polymer blend of claim 16, wherein n is 2 to 40, $R^2$ is $C_1$ to $C_{10}$ alkyl and $R^3$ is $C_1$ to $C_{20}$ alkyl.

18. The polymer blend of claim 16, wherein n is 2 to 20, $R^2$ is $C_3$ alkyl and $R^3$ is $C_8$ to $C_{10}$ alkyl.

19. The polymer blend of claim 16, wherein $R^2$ is an alkyl group having from 2 to 4 carbon atoms.

20. The polymer blend of claim 16, wherein $R^2$ is selected from the group consisting of —$(CH_2)_3$—, —$CH_2CH(CH_3)$—, and —$CH(CH_3)CH_2$—.

21. The polymer blend of claim 16, wherein $R^3$ is a mixture comprising —$(CH_2)_7CH_3$ and —$(CH_2)_9CH_3$—.

22. The method of claim 1, wherein the polymer blend has at least a 5% reduction in tensile strength compared to the tensile strength of the biopolymer and at least a 5% reduction in tensile at break compared to the tensile at break of the biopolymer.

23. The method of claim 1, wherein the polymer blend comprises polymers, the polymers consisting of (i) the biopolymer and (ii) the polyester.

24. The polymer blend of claim 2, wherein the polymer blend comprises polymers, the polymers consisting of (i) the biopolymer and (ii) the polyester.

* * * * *